US012583313B2

(12) United States Patent
Brown et al.

(10) Patent No.: US 12,583,313 B2
(45) Date of Patent: Mar. 24, 2026

(54) COMBINED FUEL LEVEL SENDING UNIT AND FUEL FILL LIMIT VENT VALVE

(71) Applicant: Whitecap Industries, Inc., Piscataway, NJ (US)

(72) Inventors: Christopher Brown, Jupiter, FL (US); Todd Moore, St. Paul, MN (US); Christopher E. Tomao, Robbinsville, NJ (US)

(73) Assignee: Whitecap Industries, Inc., Piscataway, NJ (US)

( * ) Notice: Subject to any disclaimer, the term of this patent is extended or adjusted under 35 U.S.C. 154(b) by 0 days.

(21) Appl. No.: 18/809,991

(22) Filed: Aug. 20, 2024

(65) Prior Publication Data

US 2026/0054564 A1 Feb. 26, 2026

(51) Int. Cl.
| | |
|---|---|
| *B60K 15/035* | (2006.01) |
| *B60K 15/03* | (2006.01) |
| *G01F 23/62* | (2006.01) |

(52) U.S. Cl.
CPC ........ B60K 15/03519 (2013.01); G01F 23/62 (2013.01); *B60K 2015/03217* (2013.01); *B60K 2015/03576* (2013.01)

(58) Field of Classification Search
CPC .... B60K 15/03519; B60K 2015/03217; B60K 2015/03576
See application file for complete search history.

(56) References Cited

U.S. PATENT DOCUMENTS

| | | | | |
|---|---|---|---|---|
| 4,437,162 A | * | 3/1984 | Kato | G01F 23/804 |
| | | | | 702/53 |
| 4,884,444 A | * | 12/1989 | Tuckey | G01F 23/226 |
| | | | | 73/290 R |
| 6,289,728 B1 | * | 9/2001 | Wilkins | G01F 23/62 |
| | | | | 73/322 |
| 6,597,998 B1 | | 7/2003 | Gonring | |
| 8,464,764 B1 | | 6/2013 | Milsom | |
| 11,738,990 B2 | | 8/2023 | Brown et al. | |
| 2005/0268715 A1 | * | 12/2005 | Sabatino | H05K 1/189 |
| | | | | 73/313 |
| 2006/0118200 A1 | * | 6/2006 | Nies | A01G 25/165 |
| | | | | 141/198 |
| 2016/0011037 A1 | * | 1/2016 | Sugio | B60T 17/004 |
| | | | | 96/417 |
| 2018/0017430 A1 | * | 1/2018 | Aghili | G01F 9/00 |
| 2019/0170561 A1 | | 6/2019 | Manabe et al. | |
| 2022/0402747 A1 | * | 12/2022 | Brown | B67D 7/365 |

* cited by examiner

*Primary Examiner* — Patrick C Williams
(74) *Attorney, Agent, or Firm* — Servilla Whitney LLC

(57) ABSTRACT

A combined fuel level sending unit and fuel fill limit vent valve configured for use with a fuel tank is disclosed including a sending unit rod having a first end and a second end defining a length and a plurality of sensors disposed along its length mounted to a valve body which includes a first valve port, including a receptacle and a valve seat, and a second valve port, mounted to the valve body, in fluid communication and defining an inner sidewall and an outer sidewall. An ullage float comprising a magnet is also slidably mounted on the sending unit rod between the first end and a sealing ledge on the valve seat so that the ullage float fits within the receptacle and valve seat in the valve body. It comprises a magnet configured to interact with the plurality of sensors to provide an indication of a level of fuel in the fuel tank.

19 Claims, 5 Drawing Sheets

COMBINED FUEL LEVEL SENDING UNIT AND FUEL FILL LIMIT VENT VALVE

TECHNICAL FIELD

The present disclosure relates to a combined fuel level sending unit and fuel fill limit vent valve configured for use with a fuel tank for use in marine applications.

BACKGROUND

The present disclosure relates generally to fuel tanks, and more particularly to fuel tanks installed in watercraft, such as ships, yachts, boats, personal watercraft (e.g., a small boat propelled by an inboard water jet engine, such as a JETSKI® or a SEADOO®). More specifically, the disclosure relates to assemblies configured to control spillage of fuel and ventilation of vapors from fuel tanks, and in particular, watercraft fuel tanks.

Due to environmental concerns, boat fuel tanks are federally regulated and are required to eliminate the propensity of raw fuel or vapor from exiting the fuel tank and fuel system into to a waterway (i.e., river, lake, stream, ocean, etc.) and the atmosphere. An Environmental Protection Agency (EPA) regulation requires a controlled filling process to prevent "spitting back" raw fuel into the vessel or into the waterway. Accordingly, boat operators and personnel who fill watercraft fuel tanks must be able to fill the fuel tank without fuel "spitting back" from the tank or spilling.

The marine industry has adopted automotive (cars and trucks) technology, and a typical assembly includes a fuel fill limit vent valve installed on the tank, a fuel fill limit valve installed on the fuel inlet hose just above the tank, and a fuel level sending unit installed to send information to the helm to let the consumer know the fuel level of the boat. During filling, as fuel rushes into the tank, air that is displaced runs out through the fuel fill limit vent valve. When the fuel reaches the maximum fill level, the fuel fill limit vent valve closes, shutting off airflow. At this point, the fuel backs up the fill hose and trips the aspirator on the nozzle to shutoff. The fuel fill limit valve prevents fuel in the tank from backing up the fill hose, onto the vessel, or into the waterway.

Fuel tanks in marine vessels, like automotive fuel tanks, are required to maintain a minimum fuel vapor expansion space or ullage of no less than 5%. Unlike automotive fuel tanks, which have a more finite number of sizes, shapes and mounting configurations, watercraft fuel tanks have a wider variety of sizes and shapes. In addition, there is a wider variety of how and where a fuel tank is mounted on a watercraft. Furthermore, recreational watercraft experience angular altitudes during water refueling, boating activities, adverse weather conditions and storage. Existing fuel tank ullage assemblies utilize separate fuel fill limit vent valves, fill limit valves, and fuel level sending units that are mounted directly to the tank.

FIGS. 1A and 1B show a prior art fuel tank 50 for watercraft, having a fuel fill limit valve 52, which acts to shut off a gas nozzle inserted in the watercraft fuel fill port 51, a fuel level sending unit 56, which sends a signal to fuel level indicator (not shown) configured to show an amount of fuel in the fuel tank, and a fuel fill limit vent valve 54. The fuel fill limit vent valve 54 permits gases or air to escape or be drawn in during a refueling process or from the natural thermal expansion of the fuel as the ambient temperature surrounding the fuel tank rises. The fuel fill limit vent valve 54 also works in conjunction with the fuel fill limit valve 52 to activate shutoff of a gas nozzle (not shown) inserted in the fuel fill port 51 during the refilling process. The fuel fill limit valve 52 includes a limit float 53, the fuel limit vent valve 54 has a vent float 55, and the fuel level sending unit 56 has a sending unit float 57. The limit float 53 and the vent float 55 float upwardly as the fuel level in the fuel tank 50 increases, and eventually when a predetermined limit has been reached, the gas nozzle (not shown) that is used to fill the fuel tank 50 is activated to shut off. This also provides the correct vapor space in the fuel tank 50 to comply with EPA standards and to prevent spillage of fuel. There is a need to provide improved systems for fuel tank level sensing and fuel fill limit vent valves.

SUMMARY

One or more embodiments of the disclosure are directed to a combined fuel level sending unit and fuel fill limit vent valve configured for use with a fuel tank comprising a sending unit rod having a first end and a second end defining a length and a plurality of sensors disposed along the sending unit rod; a valve body including a first valve port and a second valve port in fluid communication and defining an inner sidewall and an outer sidewall, the first valve port including a receptacle and a valve seat, the second end of the sending unit rod mounted to the valve body; and an ullage float slidably mounted on the sending unit rod between the first end and the valve seat, the ullage float configured to fit within the receptacle of the valve body and to contact the valve seat in the valve body, and the ullage float including a sealing ledge that is configured to seal against the valve seat, the ullage float comprising a magnet configured to interact with the plurality of sensors to provide an indication of a level of fuel in the fuel tank.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Figures 1A, 1B:
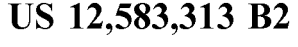
FIG. 1A is a front isometric view of a prior art fuel tank with a separate fuel fill limit vent valve, fuel fill limit valve, and fuel level sending unit
FIG. 1B is a cross-sectional view of the fuel tank shown in FIG. 1A.
Figures 2A, 2B:
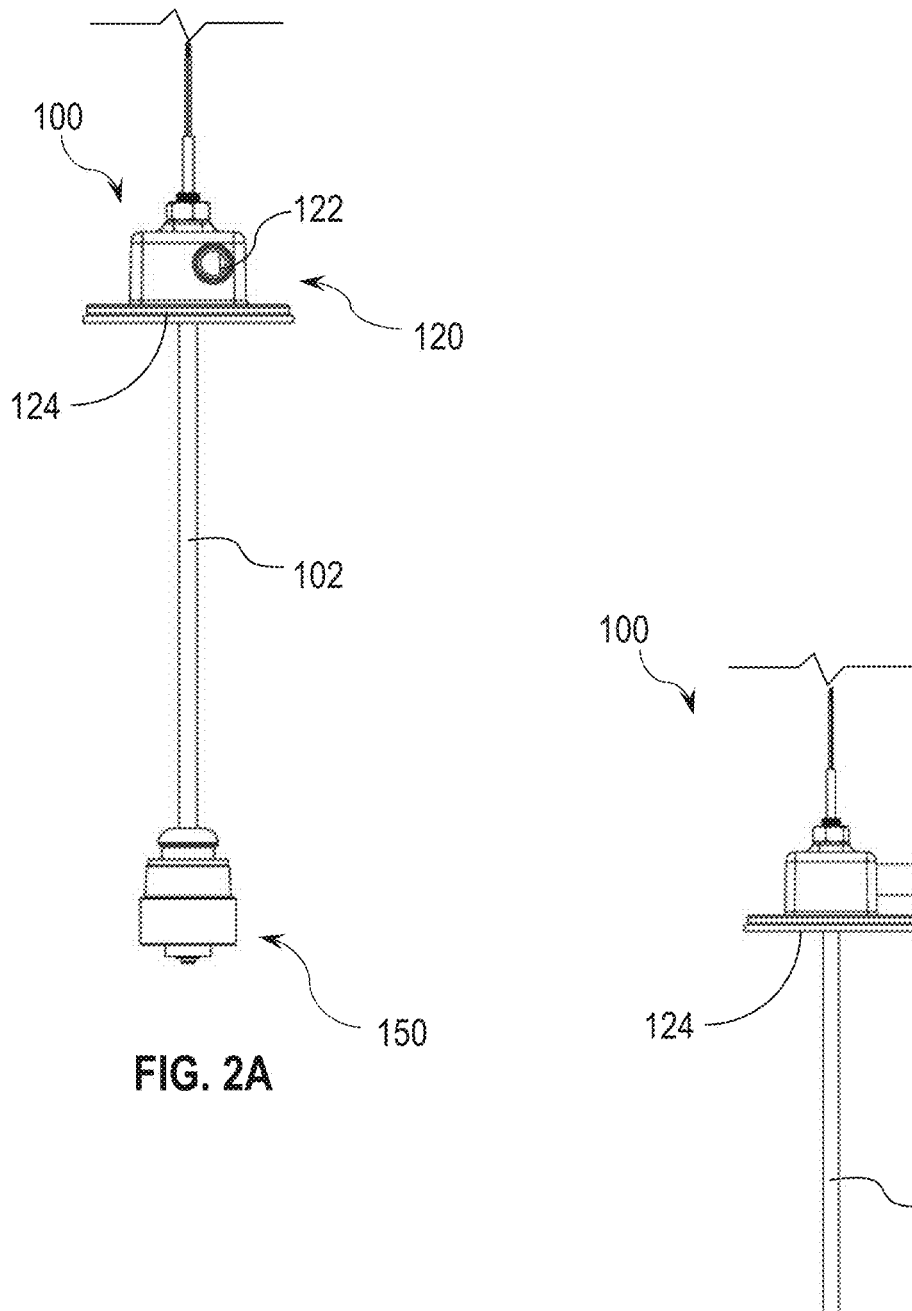
FIG. 2A is a front view of the combined fuel level sending unit and fuel fill limit vent valve according to one or more embodiments of the disclosure.
FIG. 2B is a side view of the combined fuel level sending unit and fuel fill limit vent valve of FIG. 2A.
Figures 2C, 3:
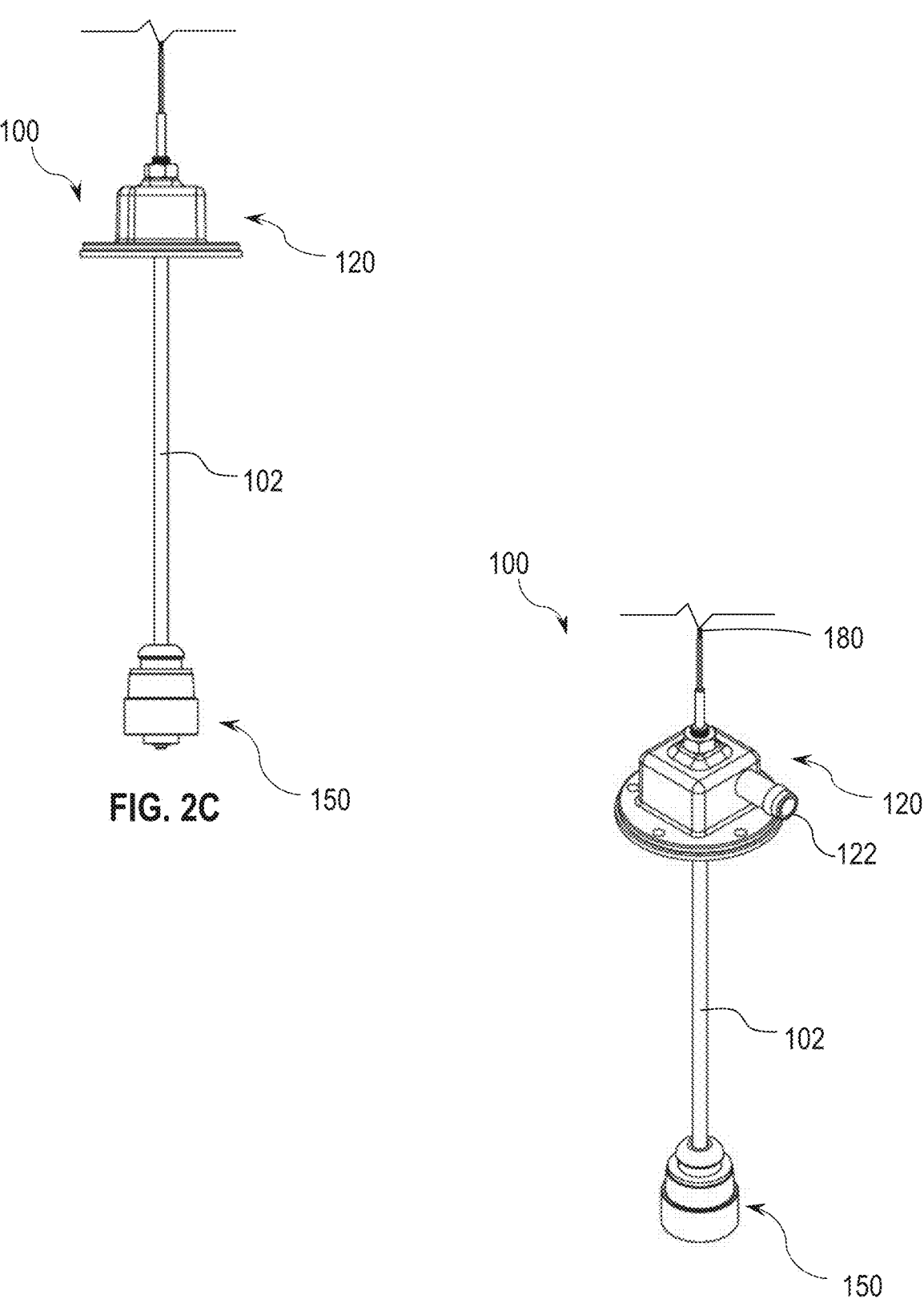
FIG. 2C is a back view of the combined fuel level sending unit and fuel fill limit vent valve of FIG. 2A.
FIG. 3 is an isometric view of the combined fuel level sending unit and fuel fill limit vent valve of FIG. 2A.
Figure 4:
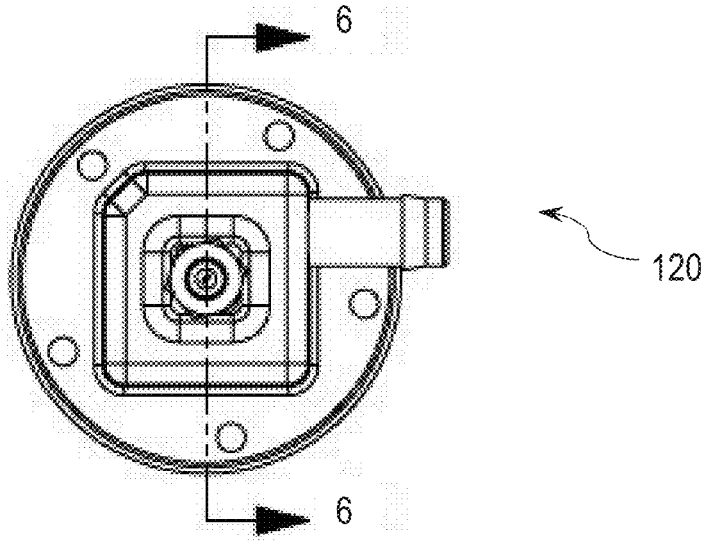
FIG. 4 is a top view of the combined fuel level sending unit and fuel fill limit vent valve of FIG. 2A.
Figure 5:
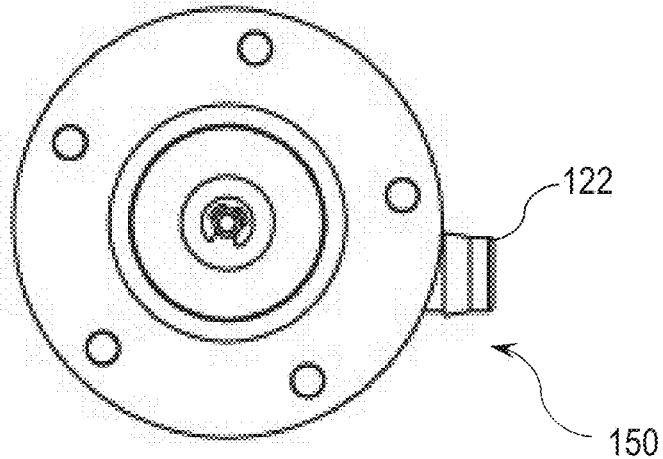
FIG. 5 is a bottom view of the combined fuel level sending unit and fuel fill limit vent valve of FIG. 2A.

Advantageously, embodiments of the present disclosure provide an elegant solution to long-standing problems with the construction and maintenance of watercraft fuel tanks of the type shown in FIGS. 1A-B. As can be seen from a review of FIGS. 1A-B, the fuel fill limit valve 52, the fuel fill limit vent valve 54 and the sending unit 56 are separate components mounted to the fuel tank 50. These separately mounted components provide multiple areas for potential fuels leaks. In addition, watercraft manufacturers must provide separate access panels to access these separate components. The access panels are typically small, and this creates difficulties during assembly and maintenance of the watercraft fuel system. One or more embodiments of the present disclosure address and/or eliminate these deficiencies.

With respect to terms used in this disclosure, the following definitions are provided. As used herein, the use of "a," "an," and "the" includes the singular and plural.

Embodiments of the disclosure provide a combined fuel level sending unit and fuel fill limit vent valve 100 that is configured to provide greatly improved access to the fuel tank for maintenance and assembly in accordance with EPA regulations. One or more embodiments of the combined fuel level sending unit and fuel fill limit vent valve 100 provide one or more of simplicity in design, ease of maintenance, ease of manufacturing, reliability, low cost, resistance to fuel permeation, and increased safety for the environment than existing assemblies and methods. Embodiments of the combined fuel level sending unit and fuel fill limit vent valve 100 also eliminate the need for a separate device to send fuel information from the fuel fill limit vent valve to the helm of the boat for the consumer to read fuel information, which render existing assemblies unduly complex.

A first aspect of the disclosure pertains to a combined fuel level sending unit and fuel fill limit vent valve 100 configured for use with a fuel system, for example a marine watercraft fuel system. Referring now to FIGS. 2A-6, according to one or more embodiments a combined fuel level sending unit and fuel fill limit vent valve 100 is shown comprising a sending unit rod 102 having a first end 104 and a second end 106 defining a length. In the embodiment shown, the first end 104 is a lower end and the second end 106 in an upper end. In use, the combined fuel level sending unit and fuel fill limit vent valve 100 would be mounted so that the second end 106 would be mounted to the top side of a fuel tank of the type shown in FIG. 1A and the first end 104 would be adjacent to the fuel tank bottom in FIGS. 1A-B.

The combined fuel level sending unit and fuel fill limit vent valve 100 includes a plurality of sensors disposed along the sending unit rod 102, as described further below. Both ends can be permanently affixed to the watercraft fuel system, for example by welding, or one end can be removably affixed to the tank, for example using a threaded connection. The sending unit rod and other components can comprise fuel-resistant and non-corrosive material. In one or more embodiments of the disclosure, the material of the sending unit rod 102 is selected from a group that includes but is not limited to: aluminum and aluminum alloys, copper and copper alloys, titanium and titanium alloys, nickel alloys, Iron, steel, stainless steels and other metals with appropriate fuel-resistance and non-corrosive properties widely used in the marine industry. In one or more embodiments, the sending unit rod 102 is a hollow rod, configured to receive a plurality of sensors and reed switches as described further below.

The combined fuel level sending unit and fuel fill limit vent valve 100 further comprises a valve body 120 including a first valve port 122 and a second valve port 124 in fluid communication with each other. The second valve port 124 defines an inner sidewall 126 and an outer sidewall 128 of the valve body. In the embodiment shown, the first valve port 122 and the second valve port 124 are shown as being at a right angle (90 degree angle) to each other, but this configuration is nonlimiting. In some embodiments, the first valve port 122 and the second valve port 124 are at angles that are not at a 90 degree angle to each other. The second valve port 124 includes a receptacle 130 and a valve seat 132. The second end 106 of the sending unit rod 102 is mounted to the valve body 120. The second end 106 can be mounted by a threaded connection, a compression fitting or any other suitable connection.

The combined fuel level sending unit and fuel fill limit vent valve 100 further comprises an ullage float 150 slidably mounted on the sending unit rod 102 between the first end 104 and the valve seat 132. The ullage float 150 is configured to fit within the receptacle of the valve body 120 and to contact the valve seat 132 in the valve body 120, and the ullage float 150 including a sealing ledge 160 that is configured to seal against the valve seat 132.

Figure 6:
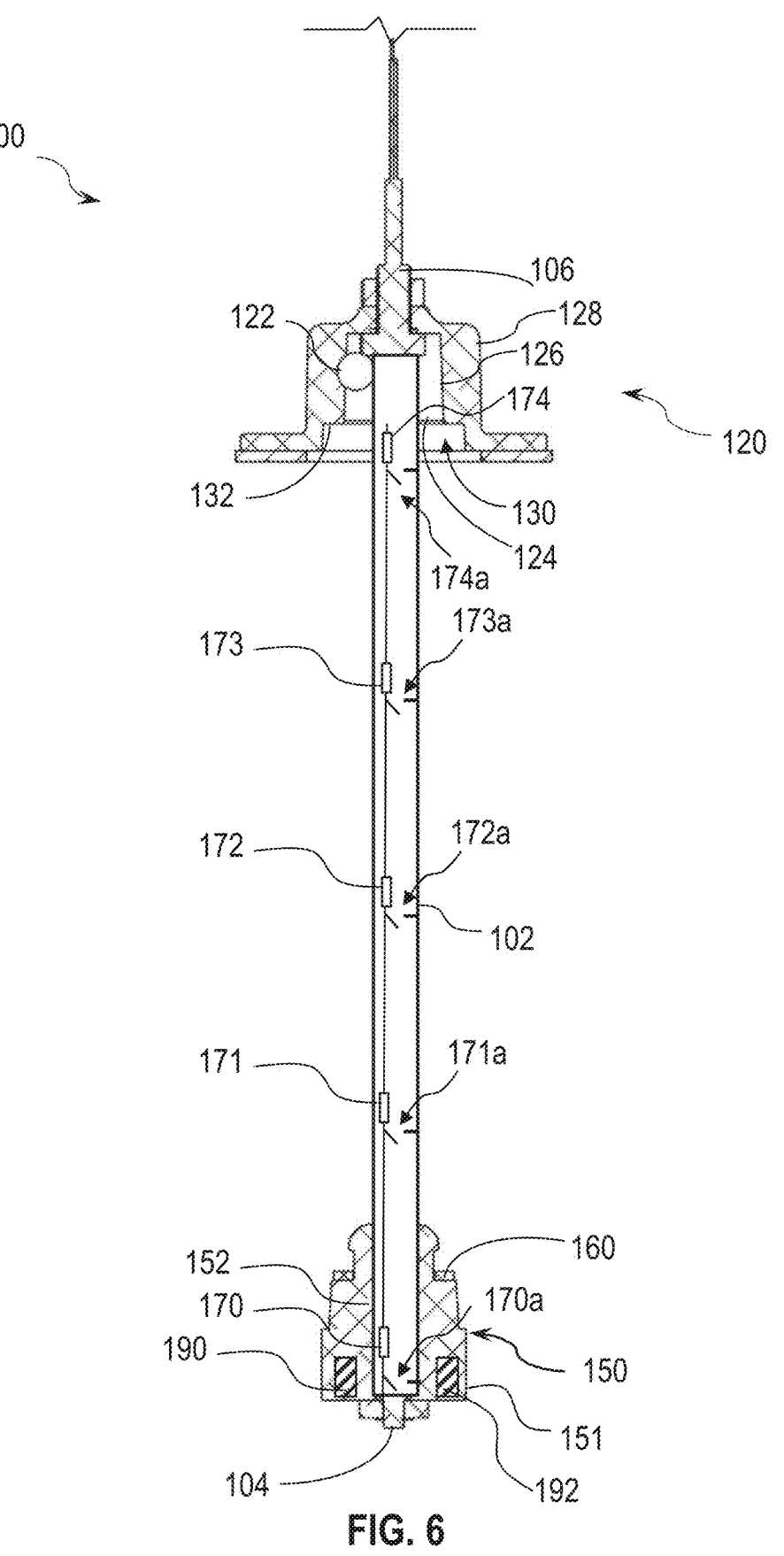
FIG. 6 is a cross-sectional view of the combined fuel level sending unit and fuel fill limit vent valve taken along line 6-6 of FIG. 4A.

The ullage float 150 includes a magnet configured to interact with the plurality of sensors to provide an indication of a level of fuel in the fuel tank. Referring to FIG. 6, in the embodiment shown, the ullage float 150 includes a first magnet 190 and a second magnet 192 embedded in the ullage float 150. In specific embodiments, the first magnet 190 and the second magnet 192 are spaced 180 degrees apart from each other. In another specific embodiment, the first magnet 190 and the second magnet 192 are embedded in the ullage float 150 so that the first magnet 190 and the second magnet 192 are not exposed to an external surface 151 of the ullage float 150. Advantageously, when the first magnet 190 and the second magnet 192 are internal to the external surface 151 of the ullage float, problems are avoided with contamination of the first magnet 190 and the second magnet that can interfere with operation of the combined fuel level sending unit fuel fill limit vent valve.

In the embodiment shown in FIG. 6, there is a plurality of sensor 170-174 that interact with the magnet to provide a fuel level reading to a fuel gage (not shown). A first sensor 170 is shown at the first end 104 of the sending unit rod 102. A first reed switch 170a is positioned adjacent to the first sensor 170 at the first end 104 of the sending unit rod. Before the ullage float 150 with the first magnet 190 and the second magnet 192 traverses past the first reed switch 170a there is a minimum voltage signal $V_{min}$ (e.g., ~0V) indicating that the fuel tank is empty (E).

As the ullage float 150 moves up the sending unit rod past each reed switch, the voltage signal increases to a higher value, indicating a higher fuel level. In the nonlimiting example shown, a second reed switch 171a and a second sensor 171 are positioned along the length of the sending unit rod 102 that may be equivalent to a one-quarter (¼) fuel tank level, a third reed switch 172a, and a third sensor 172 are positioned along the length of the sending unit rod 102 that may be equivalent to a one-half (½) fuel tank level. Continuing, a fourth reed switch 173a, and a fourth sensor 173 are positioned along the length of the sending unit rod 102 that may be equivalent to a three-quarters (¾) fuel tank level, and a fifth reed switch 174a, and a fourth sensor 174 are positioned along the length of the sending unit rod 102 that may be equivalent to a full (F) fuel tank level. Further details on the interaction and operation of the reed switches 170a-174a and the plurality of sensors 170-174 would be understood by a person of ordinary skill in the art. In one or more embodiments the plurality of sensors are resistors.

The plurality of reed switches and the plurality of reed sensors are arranged to provide a circuit that provides a potentiometric feedback across two outputs as the ullage float 150 including a magnet moves along the length of the sending unit rod 102. The plurality of reed switches and the plurality of sensors can be configured so that a full tank gives high resistance and an empty tank gives low resistance, or vice versa. Resistor values should be selected according to the shape of the tank.

In one or more embodiments of the disclosure, the combined fuel level sending unit and fuel fill limit vent valve 100 is of a length equal to an interior height of the fuel tank. It will be understood that the height of fuel tanks will vary depending on the space in the marine vessel, the size of the vessel and other factors.

The plurality of resistors and the plurality of reed switches are contained within the sending unit rod 102 which is hollow. In one or more embodiments, the plurality of sensors and the plurality of reed switches are mounted to a circuit board, for example, as part of a printed circuit board. It will be appreciated that the printed circuit board will be sized and shaped to fit within the sending unit rod 102, and therefore the circuit board will be an elongate circuit board having a width that is less than the inner diameter of the sending unit rod 102.

In one or more embodiments of the disclosure, the combined fuel level sending unit and fuel fill limit vent valve 100 further includes a sending unit rod 102 further comprises a wire 180 configured to connect the combined fuel level sending unit and fuel fill limit vent valve 100 to a fuel gage (not shown). The wire 180 can be any suitable size and thickness to send a signal to a conventional fuel gage used in marine applications. The gage can be a digital gage, an analog gage, for example, including a needle and printed incremental values on the gage. The fuel gage can provide any suitable quantity of fuel level increments, such as in one-quarter of tank increments, one-eighth of a tank increments or in digital or gallon increments as desired by the end user or marine vessel manufacturer.

In one or more embodiments of the disclosure, the plurality of sensors are spaced along the length in increments corresponding to fuel level increments on the fuel gage.

In one or more embodiments of the disclosure, movement of the ullage float 150 along the length of the sending unit rod 102 changes a resistance reading that is transmitted to the fuel gage via the wire 180 at the second end 106 of the combined fuel level sending unit and fuel fill limit vent valve 100.

In one or more embodiments of the disclosure, the combined fuel level sending unit and fuel fill limit vent valve 100 includes a fuel gage comprising a light emitting diode display.

In another embodiment of the disclosure, the combined fuel level sending unit and fuel fill limit vent valve 100 the ullage float 150 further comprises an internal surface adjacent to the sending unit rod 102 and an external surface, wherein the magnet configured is located adjacent to the internal surface 152 of the ullage float 150.

The magnet configuration in the embodiment shown including a first magnet 190 and a second magnet 192 is not limiting. In one or more embodiments of the disclosure, the magnet is ring-shaped and surrounds the sending unit rod 102. In other embodiments of the disclosure, the combined fuel level sending unit and fuel fill limit vent valve 100 comprises a single magnet embedded in the ullage float 150.

In one or more embodiments of the disclosure, the combined fuel level sending unit and fuel fill limit vent valve 100 comprises a plurality of magnets embedded in the ullage float 150. The plurality of magnets can include two, three, four, five, six, seven, eight or more magnets embedded in in the ullage float 150.

In one or more alternative embodiments of the disclosure the combined fuel level sending unit and fuel fill limit vent valve 100 has a magnet comprises which a magnetic coating embedded on an internal surface of the ullage float 150.

In one or more embodiments of the disclosure, a fuel level is provided by the ullage float 150 configured to movably slide along the sending unit rod 102 when an amount of fuel causes floatation lift in the fuel tank. The ullage float 150 is lifted upwards towards the second end 106 of the sending unit rod 102 as the fuel fill line increases within a fuel tank. Alternatively, the ullage float 150 moves downwards toward the first end 104 of the sending unit rod 102 when the fuel fill line in a fuel tank decreases. A resistance signal is changed as the plurality of reed switches are opened and closed, which are adjacent to each of the plurality of resistors as described herein.

In one or more embodiments of the disclosure, the ullage float 150 is comprised of a fuel-resistant and non-swelling material selected from an elastomer and a rubber. In some embodiments, the fuel-resistant and non-swelling material is selected from the group consisting of a nitrile butadiene and a fluoropolymer elastomer. In one or more embodiments, the fuel-resistant and non-swelling material is selected from the group consisting of a gas-filled nitrile butadiene and a gas-filled fluoropolymer elastomer.

In an exemplary embodiment of the disclosure, the ullage float 150 is made from a fuel-resistant and non-swelling material selected from the group consisting of a gas-filled, closed pore nitrile butadiene and a gas-filled closed pore fluoropolymer elastomer. The gas-filled closed pore fluoropolymer elastomer provides sufficient buoyancy with fuel to exert a force on the ullage float 150 great enough to slidably move the ullage float 150 along the sending unit rod and push against the valve seat 132 on the valve body 120 to terminate fluid communication between the first valve port 122 and second valve port 124. Appropriate fluoropolymer elastomer material that can be used for the ullage float 150 includes Viton®, available from E.I. du Pont de Nemours & Company, or other equivalents with similar properties of fluoropolymer elastomer materials.

Advantageously, one or more embodiments of the combined fuel level sending unit and fuel fill limit vent valve 100 solve long-standing problems with the construction and maintenance of watercraft fuel tanks. One or more embodiments described herein greatly simplifies the construction of fuel tanks and reduces the number of access ports required to maintain and or replace components that were previously separate and in different location on watercraft fuel tanks.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as disclosed.

What is claimed is:
1. A combined fuel level sending unit and fuel fill limit vent valve configured for use with a fuel tank comprising:
   a sending unit rod having a first end and a second end defining a length and a plurality of sensors disposed along the sending unit rod;

a fuel fill limit vent valve body including a first valve port and a second valve port in fluid communication and defining an inner sidewall and an outer sidewall, the first valve port including a receptacle and a valve seat, the second end of the sending unit rod mounted to the fuel fill limit vent valve body; and an ullage float slidably mounted on the sending unit rod between the first end and the valve seat, the ullage float configured to fit within the receptacle of the fuel fill limit vent valve body and to contact the valve seat in the fuel fill limit vent valve body, and the ullage float including a sealing ledge that is configured to seal against the valve seat and terminate the fluid communication between the first valve port and the second valve port when the fuel tank is full during a refueling process, the ullage float comprising a magnet configured to interact with the plurality of sensors to provide an incremental visual indication of a level of fuel in the fuel tank and when the fuel tank is empty, wherein the combined fuel level sending unit and fuel fill limit vent valve is configured to be accessed through a single access panel for maintenance of the combined fuel level sending unit and fuel level sending unit.

2. The combined fuel level sending unit and fuel fill limit vent valve of claim 1, wherein the length of the sending unit rod is equal to an interior height of the fuel tank.

3. The combined fuel level sending unit and fuel fill limit vent valve of claim 2, wherein the plurality of sensors comprises resistors.

4. The combined fuel level sending unit and fuel fill limit vent valve of claim 3, wherein the sending unit rod comprises a wire configured to connect the combined fuel level sending unit and fuel fill limit vent valve to a fuel gage.

5. The combined fuel level sending unit and fuel fill limit vent valve of claim 4, wherein the plurality of sensors are spaced along the length in increments corresponding to fuel level increments on the fuel gage.

6. The combined fuel level sending unit and fuel fill limit vent valve of claim 5, wherein the sending unit rod further comprises a circuit board comprising a plurality of sensors located at incremental fuel levels along the sending unit rod.

7. The combined fuel level sending unit and fuel fill limit vent valve of claim 5, wherein movement of the ullage float along the length of the sending unit rod changes a resistance reading that is transmitted to the fuel gage to change a fuel level reading on the fuel gage.

8. The combined fuel level sending unit and fuel fill limit vent valve of claim 7, wherein the fuel gage comprises a needle.

9. The combined fuel level sending unit and fuel fill limit vent valve of claim 7, wherein the fuel gage comprises a light emitting diode display.

10. The combined fuel level sending unit and fuel fill limit vent valve of claim 1, wherein the ullage float further comprises an internal surface adjacent to the sending unit rod and an external surface, wherein the magnet configured is located adjacent to the internal surface of the ullage float.

11. The combined fuel level sending unit and fuel fill limit vent valve of claim 10, wherein the magnet is ring-shaped and surrounds the sending unit rod.

12. The combined fuel level sending unit and fuel fill limit vent valve of claim 10, wherein the magnet is embedded in the ullage float.

13. The combined fuel level sending unit and fuel fill limit vent valve of claim 10, the ullage float comprising a plurality of magnets embedded in the ullage float.

14. The combined fuel level sending unit and fuel fill limit vent valve of claim 10, wherein the magnet comprises a magnetic coating.

15. The combined fuel level sending unit and fuel fill limit vent valve of claim 10, wherein a position of the magnet along the length of the sending unit rod corresponds to the level of fuel in the fuel tank.

16. The combined fuel level sending unit and fuel fill limit vent valve of claim 15, wherein the ullage float is configured to movably slide along the sending unit rod when an amount of fuel causes floatation lift in the fuel tank.

17. The combined fuel level sending unit and fuel fill limit vent valve of claim 1, wherein the ullage float is comprised of a fuel-resistant and non-swelling material selected from an elastomer and a rubber.

18. The combined fuel level sending unit and fuel fill limit vent valve of claim 17, wherein the fuel-resistant and non-swelling material is selected from the group consisting of a nitrile butadiene and a fluoropolymer elastomer.

19. The combined fuel level sending unit and fuel fill limit vent valve of claim 17, wherein the fuel-resistant and non-swelling material is selected from the group consisting of a gas-filled nitrile butadiene and a gas-filled fluoropolymer elastomer.

* * * * *